E. E. FOSTER.
STOP MECHANISM.
APPLICATION FILED NOV. 13, 1915.

1,328,145.

Patented Jan. 13, 1920.

Inventor
Edward E. Foster
by Charles W. McDermott
his attorney

UNITED STATES PATENT OFFICE.

EDWARD E. FOSTER, OF BEVERLY, MASSACHUSETTS, ASSIGNOR TO C. C. BLAKE, INCORPORATED, OF BOSTON, MASSACHUSETTS, A CORPORATION OF NEW YORK.

STOP MECHANISM.

1,328,145.  Specification of Letters Patent.  Patented Jan. 13, 1920.

Application filed November 13, 1915. Serial No. 61,396.

*To all whom it may concern:*

Be it known that I, EDWARD E. FOSTER, a citizen of the United States, residing at Beverly, in the county of Essex and State of Massachusetts, have invented a new and useful Improvement in Stop Mechanisms, of which the following is a specification.

The present invention relates to stop mechanism, and more particularly to stop mechanisms which invariably stop a rotary shaft at a predetermined point in its rotation.

The object of the present invention is to produce a stop mechanism of simplified and improved construction.

To the accomplishment of this object, and such others as may hereinafter appear, the features of the invention relate to certain devices, combinations and arrangements of parts, hereinafter described, and then set forth broadly and in detail in the appended claims, possessing advantages which will be apparent to those skilled in the art.

Figure 1:
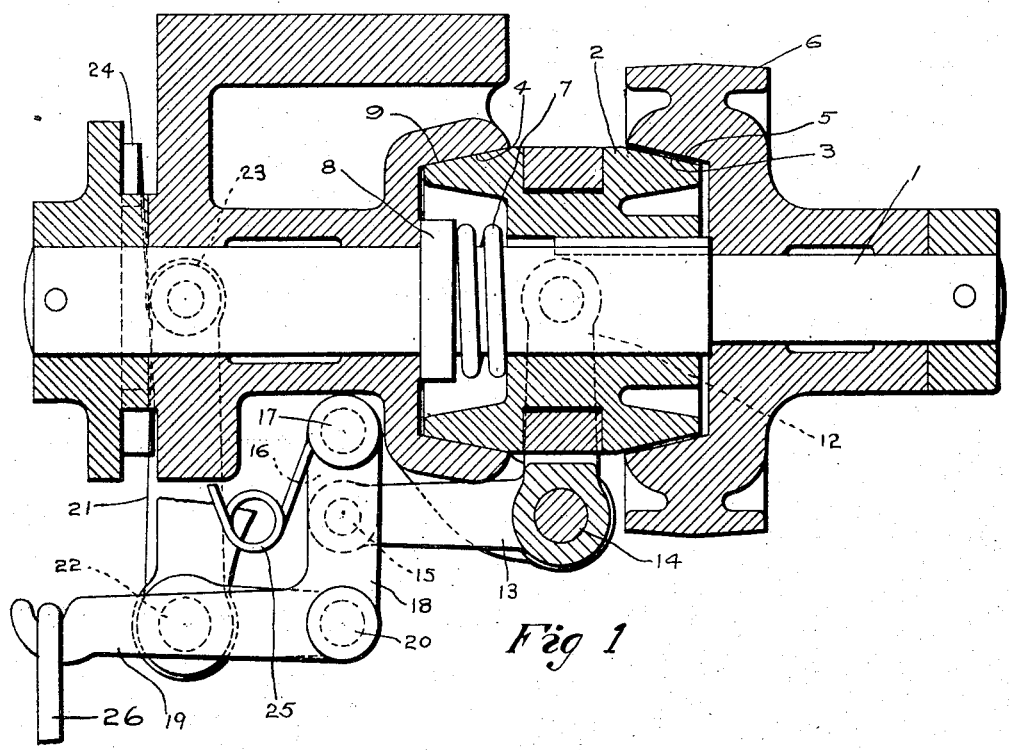
Figure 2:
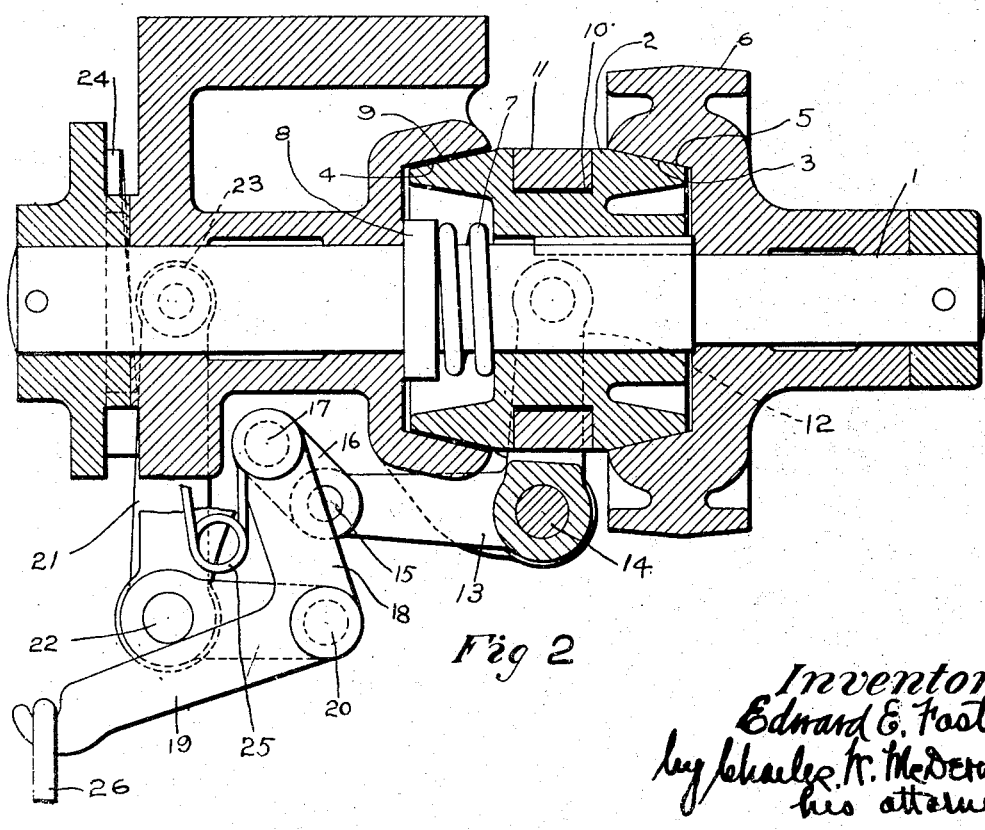

The various features of the invention will be best understood from an inspection of the accompanying drawings, illustrating the best form of the invention at present known to the inventor, in which, Figure 1 is an elevation, partly in section, of the stop mechanism, showing the position of the parts when the driving shaft is stopped; and Fig. 2 is a similar view showing the position of the parts when the driving shaft is rotated.

The stop mechanism comprises a shaft 1 to which is splined a clutch member 2 provided upon opposite sides with frusto-conical faces 3 and 4. The face 3 is arranged to engage a similar face 5 formed internally on a pulley 6 which is loosely mounted on the shaft 1 and which is driven from some suitable source of power through a belt (not shown). The face 3 is forced against the face 5 by a spring 7 coiled around the shaft 1 and interposed between the clutch member 2 and a collar 8 on the shaft 1. The clutch member 2 is normally held away from the pulley 6 against the tension of the spring 7 by mechanism, to be described, which holds the face 4 on the clutch member engaged with a brake 9 formed on a bearing for the shaft 1.

In order to shift the clutch member 2 on the shaft 1 out of engagement with the pulley and into engagement with the brake the clutch member 2 is provided with a peripheral groove 10 which loosely receives a strap 11 to which is connected two arms of a yoke 12. The yoke 12 is formed on the vertical arm of a bell crank lever 13 which is mounted on a stationary pivot 14. The horizontal arm of the bell crank lever 13 is pivoted at 15 to a short link 16 which is pivoted at 17 to the vertical arm 18 of a bell crank lever 19. The bell crank lever 19 is pivoted at 20 to the horizontal arm of a bell crank lever 21 mounted on a stationary pivot 22. The vertical arm of the bell crank lever 21 is provided with a cam roll 23 arranged to engage a face cam 24 on the shaft 1.

With this construction the link 16 and arm 18 form a toggle one arm of which is inverted. The pivots 15, 17 and 20 of this toggle are normally held in a line normal to the direction of movement of the clutch member by a looped spring 25 one end of which is connected to the bearing for the shaft 1 and the other end of which is connected to the pivot 17. When the pivots 15, 17 and 20 are in line or, stated in another way, when the toggle is made, any movement of the roll 23 to the right under the influence of the cam 24 will operate to lower the horizontal arm of the bell crank lever 13 exactly as if the horizontal arm of the bell crank lever 13 were connected by a slot and pin connection to the horizontal arm of the bell crank lever 21. The movement of the roll 23 to the right under the influence of the cam 24 moves the clutch member 2 away from the pulley 6 and into engagement with the brake 9 against the tension of the spring 7. The cam face 23 gradually rises so that at a predetermined point in the rotation of the shaft the clutch member 2 is engaged with the brake 9 thus stopping the shaft at the predetermined point. The predetermined point in the rotation of the shaft at which the shaft is stopped may be varied by rotating the cam 24 on the shaft.

It will be apparent to those skilled in the art that there is an important advantage in interposing a toggle having an inverted arm in the connections between the cam and the clutch member. If an ordinary toggle is used there is a tendency for the shock transmitted from the cam to the toggle to break the toggle thus permitting the shaft to overrun. By employing a toggle having one inverted arm the three pivots of the toggle are positively locked in alinement during the transmission of the cam movement to the clutch member thus insuring the stopping of the shaft at the proper time.

As shown in Fig. 1 the shaft 1 is disconnected from the pulley 6. In order to clutch the pulley 6 to the shaft 1 the horizontal arm of the bell crank lever 19 is depressed through a treadle rod 26. This breaks the inverted toggle thus releasing the clutch member 2 to the influence of the spring 7 which forces the clutch member 2 into engagement with the pulley 6. The cam roll 23 is also withdrawn from the cam face 24 to permit the rotation of the cam without engagement therewith. When it is desired to stop the machine the treadle rod 26 is released. If the cam roll 23 is free to return to a low part of the cam face 24 the spring 25 remakes the toggle thus resetting the connections between the cam and the clutch member 2 so that the clutch member 2 is operated by the cam into engagement with the brake. If the cam roll 23 is not free to return to a low part of the cam but engages instead a higher part on the cam than needed to stop the driving shaft at the predetermined point the toggle is not remade but yields sufficiently to permit the cam roll to roll over the high part on the cam. As soon, however, as the cam roll reaches the low part on the cam the toggle is remade and the driving shaft is stopped as soon as the cam roll 23 reaches the stopping point on the cam face.

It will be clear to those skilled in this class of devices, and with the general objects of the present invention in view, that changes may be made in the details of structure, the described and illustrated embodiment thereof being intended as an exploitation of its underlying essentials, the features whereof are definitely stated in their true scope in the claims herewith.

What is claimed as new, is:—

1. A stop mechanism, having, in combination, a driving pulley, a brake, a clutch member arranged to alternately engage the pulley and brake, a spring for moving the clutch member into engagement with the pulley, and mechanism for positively moving the clutch member into engagement with the brake comprising a cam and connections between the cam and the clutch member including a toggle, one arm of which is inverted, substantially as described.

2. A stop mechanism, having, in combination, a driving pulley, a brake, a clutch member arranged to alternately engage the pulley and brake, a spring for moving the clutch member into engagement with the pulley, and mechanism for positively moving the clutch member into engagement with the brake comprising a cam and connections between the cam and the clutch member including a toggle having when the driving shaft is stopped three floating pivots in a line normal to the direction of movement of the clutch member, substantially as described.

3. A stop mechanism, having, in combination, a driving pulley, a brake, a clutch member arranged to alternately engage the pulley and brake, a spring for moving the clutch member into engagement with the pulley, and mechanism for positively moving the clutch member into engagement with the brake comprising a cam and connections between the cam and the clutch member including a floating bell crank lever, substantially as described.

4. A stop mechanism, having, in combination, a driving pulley; a brake; a clutch member arranged to alternately engage the pulley and brake; a spring for moving the clutch member into engagement with the pulley; and mechanism for positively moving the clutch member into engagement with the brake comprising a cam and connections between the cam and the clutch member including a bell crank lever having a stationary pivot, a cam roll on its vertical arm and a second bell crank lever pivoted on its horizontal arm, a third bell crank lever having a stationary pivot and its vertical arm connected to the clutch member, and a link pivoted to the vertical arm and horizontal arm of the second and third bell crank levers, respectively, substantially as described.

5. A stop mechanism, having, in combination, a driving pulley; a brake; a clutch member arranged to alternately engage the pulley and brake; a spring for moving the clutch member into engagement with the pulley; and mechanism for positively moving the clutch member into engagement with the brake comprising a cam and connections between the cam and the clutch member including a bell crank lever having a stationary pivot, a cam roll on its vertical arm and a second bell crank lever pivoted on its horizontal arm, a third bell crank lever having a stationary pivot and its vertical arm connected to the clutch member, and a link pivoted to the free ends of the vertical arm and horizontal arm of the second and third bell crank levers, respectively, substantially as described.

6. A stop mechanism, having, in combination, a driving pulley, a brake, a clutch member arranged to alternately engage the pulley and brake, a spring for moving the clutch member into engagement with the pulley, mechanism for normally holding the clutch member engaged with the brake against the tension of the spring comprising a cam and connections between the cam and clutch member including a cam roll and a toggle, manual means for breaking the toggle to withdraw the cam roll from the cam and release the clutch member to the influence of the spring, and automatic means for remaking the toggle and restoring the cam roll to the influence of the cam when the manual means is released, substantially as described.

7. A stop mechanism, having, in combination, a driving shaft, a pulley loosely mounted thereon, a stationary brake, a clutch member splined on the shaft, yielding means for moving the clutch member into engagement with the pulley, and positive means for moving the clutch member into engagement with the brake including a toggle constructed to lock its pivots in a line normal to the axis of the shaft during the movement of the clutch member toward the brake, substantially as described.

EDWARD E. FOSTER.